No. 750,370. Patented January 26, 1904.

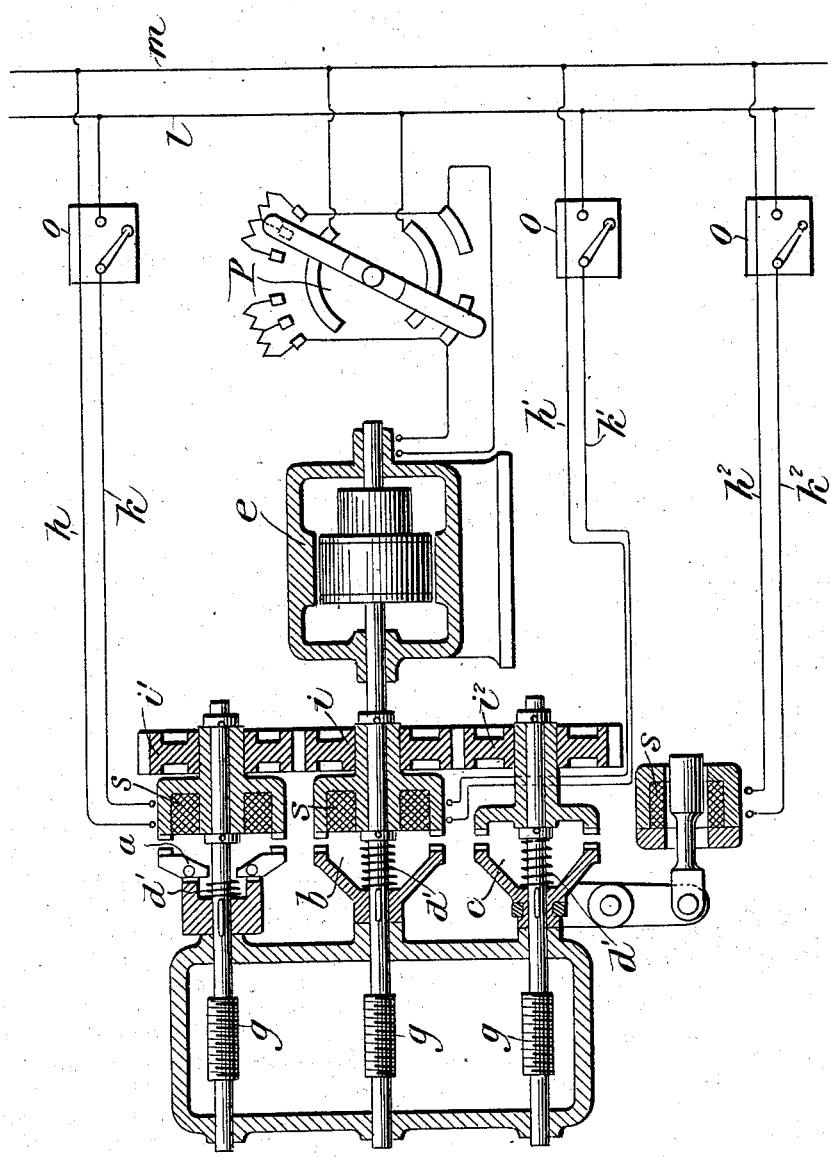

UNITED STATES PATENT OFFICE.

OTTO KAMMERER, OF CHARLOTTENBURG, GERMANY.

ELECTRIC GEAR FOR CRANES.

SPECIFICATION forming part of Letters Patent No. 750,370, dated January 26, 1904.

Application filed May 11, 1900. Serial No. 16,388. (No model.)

*To all whom it may concern:*

Be it known that I, OTTO KAMMERER, a subject of the King of Prussia, German Emperor, and a resident of 148 Berlinerstrasse, Charlottenburg, near Berlin, in the Kingdom of Prussia, German Empire, have invented certain new and useful Improvements in Electric Gears for Cranes, of which the following is an exact specification.

Cranes driven by engines, by hydraulic motors, or electric motors were employed hitherto in different constructional forms—first, cranes driven by one motor in which the different movements were attained by using friction couplings; second, cranes in which several motors were employed—that is to say, in which a separate motor is employed for each movement. Both these mentioned forms of construction allow different movements simultaneously; but with small cranes, and particularly for traveling cranes or rotating cranes for workshops, which cranes are not much used, it suffices to carry out the movements separately. For this limited case my new arrangement is provided, consisting in magnetic clutches, by which the motor is coupled to the various crane-gears.

Cranes have already been constructed in which the movements were carried out separately; but in these cranes either a separate motor was arranged for each movement, which arrangement is naturally very expensive, or one motor was arranged and the different movements were effected by coupling different gears with this motor, which coupling was effected by friction-couplings. Also this construction has been very disadvantageous on account of only small speeds being allowed in friction-couplings, as the surfaces to be pressed against each other while rotating are quickly worn out. The gearings are also very complicated and expensive. In order to do away with these disadvantages, I employ my new arrangement illustrated in the accompanying drawing.

There is employed only one motor $e$, which runs only when the crane is to be moved and which is capable of being governed. This motor is connected, by means of several magnetic clutches $a$ $b$ $c$, to the various crane-gears $g$. One part of each pair of clutches is rigidly connected to the motor and the other part is rigidly connected to the crane-gear $g$. While the crane-gear is at rest, the parts of the corresponding clutches are kept out of engagement by means of springs $d'$, a weight, or the like.

When an electric current streaming through the wires $h$ $k$, $h'$ $k'$, or $h^2$ $k^2$ excites an electric coil arranged in one part of each pair of clutches, the corresponding parts engage each other, being attracted by the magnetic force. Then the motor is set at work in one or the other direction, and the crane performs the desired movement. The current for driving the motor is led through the wires $l$ and $m$, and the wires $h$ $k$, $h'$ $k'$, and $h^2$ $k^2$ are advantageously connected to the wires $l$ $m$. In order to excite one of the electric coils, switches $o$ are arranged, by the closing of each of which switches another coil is energized. For setting the motor at work in either direction a reversing-switch $p$ is arranged.

The construction of the magnetic clutches may be different. In the drawing three different constructions of my magnetic clutches are shown. The clutch $a$ consists of a coil $s$, situated in a cup manufactured of soft iron. This cup as well as the gear $i'$ are rigidly fixed to the shaft. The edge of this cup is provided with cut-outs. The other part of the coupling consists of a cup-formed part to which two two-armed levers are hinged. One arm of said levers is provided with a nose fitting into the cut-outs of the edge of the cup. The other arm is acted upon by a spiral spring $d'$. If current is lead through the coil $s$, the levers are attracted and swing around their pivots, and their noses enter into the cut-outs of the edge of the cup. If the current is interrupted, the spiral spring $d'$ brings the levers back into their normal position. It will be understood that the part in which the levers are pivoted is rigidly connected to the gear-shaft.

The construction of the clutch $b$ differs from the above construction by the whole part $b$ being movable in the longitudinal direction of the gear-shaft. The part is held in its normal position by the spiral spring $d'$ and is also provided with noses which fit into cut-outs of the edge of the cup. If the magnet consisting of the cup is energized by leading an electric current through the coil $s$, the part $b$ is attracted against the tension of the spiral spring $d'$, and the noses of the part $b$ enter into the cut-outs of the edge of the cup, hereby effecting the coupling. After interrupting the current the spiral spring $b'$ brings the part $b$ back into its normal position.

The clutch $c$ differs from the last-described construction by the coil $s$ not being situated in the cup, but being arranged separately. In the coil $s$ an iron core is situated, which in the normal position projects over the coil, as shown in the drawing. The iron core is connected by means of a double-armed lever to the part $c$, which is constructed in the same manner as the part $b$. If the coil $s$ is energized, the iron core enters into the coil and moves the part $c$ against the action of the spring $d'$ toward the cup, hereby effecting the coupling.

It will be understood that the constructions shown are only examples and that any other convenient construction of magnetic couplings may be used.

Having thus fully described the nature of my invention, what I desire to secure by Letters Patent of the United States is—

In an electric gear for cranes, the combination with a motor, rotatable in both directions, and electric wires for leading an electric current to the motor, of magnetic clutches consisting of two members, one of which members is geared to the motor, while the other is rigidly connected to a crane-gear, electric coils provided in connection with one member of each clutch, electric wires connected to the wires mentioned above and leading to each coil, switches for interrupting and closing the current streaming through these wires, and means arranged in the magnetic clutches and adapted to keep both members of the same apart, substantially as described and for the purpose set forth.

In witness whereof I have hereunto set my hand in presence of two witnesses.

OTTO KAMMERER.

Witnesses:
 WOLDEMAR HAUPT,
 HENRY HASPER.